United States Patent [19]

Cooper

[11] Patent Number: 5,675,388
[45] Date of Patent: Oct. 7, 1997

[54] APPARATUS AND METHOD FOR TRANSMITTING AUDIO SIGNALS AS PART OF A TELEVISION VIDEO SIGNAL

[76] Inventor: J. Carl Cooper, 1373 Sydney Dr., Sunnyvale, Calif. 94087

[21] Appl. No.: 174,603

[22] Filed: Dec. 28, 1993

Related U.S. Application Data

[63] Continuation of Ser. No. 64,739, May 20, 1993, abandoned, which is a continuation of Ser. No. 764,996, Sep. 24, 1991, abandoned, which is a continuation of Ser. No. 356,670, May 18, 1989, abandoned, which is a continuation of Ser. No. 710,534, Mar. 13, 1985, abandoned, which is a continuation of Ser. No. 391,707, Jun. 24, 1982, abandoned.

[51] Int. Cl.$^6$ ........................................... H04N 7/08
[52] U.S. Cl. .................. 348/461; 348/466; 348/461; 348/473; 348/476; 348/484
[58] Field of Search ..................... 348/480, 479, 348/481, 484, 485, 476, 473, 474, 477, 478, 462, 461, 467, 482, 483, 423, 409, 515, 471, 472; 358/343; 381/29, 30; 375/27, 28; 341/77; H04N 7/093, 7/08

[56] References Cited

U.S. PATENT DOCUMENTS

| | | | |
|---|---|---|---|
| 2,624,797 | 1/1953 | Lawson | 358/145 |
| 3,335,219 | 8/1967 | Goldmark | 358/145 |
| 3,371,154 | 2/1968 | Frohbach | 358/145 |
| 3,446,914 | 5/1969 | Hodge | 358/145 |
| 3,506,780 | 4/1970 | Camras | 358/145 |
| 3,624,558 | 11/1971 | Bralin | 375/28 X |
| 3,819,852 | 6/1974 | Wolf | 348/478 |
| 3,902,007 | 8/1975 | Justice | 358/145 |
| 4,075,656 | 2/1978 | Beaulier | 358/43 |
| 4,134,127 | 1/1979 | Campioni | 358/147 |
| 4,156,253 | 5/1979 | Steudel | 348/524 |
| 4,233,627 | 11/1980 | Sugihara | 348/484 |
| 4,295,223 | 10/1981 | Shutterly | 348/476 X |
| 4,318,125 | 3/1982 | Shutterly | 358/145 |
| 4,321,623 | 3/1982 | Rzeszewski | 358/145 |
| 4,333,108 | 6/1982 | Quan | 358/145 |
| 4,361,852 | 11/1982 | Katzfey | 358/145 |
| 4,361,893 | 11/1982 | Bonnerot | 375/27 |
| 4,429,332 | 1/1984 | Pargee, Jr. | 348/482 |
| 4,442,461 | 4/1984 | Shirai et al. | 358/145 |
| 4,665,431 | 5/1987 | Cooper | 358/143 |
| 5,018,020 | 5/1991 | Dakin | 358/310 |
| 5,220,434 | 6/1993 | Dakin | 358/310 |

FOREIGN PATENT DOCUMENTS

| | | | |
|---|---|---|---|
| 0413462 | 6/1971 | Australia | H04N 5/04 |
| 0462030 | 7/1972 | Australia | H03K 21/00 |
| 0458878 | 9/1972 | Australia | H04B 1/66 |
| 0459928 | 9/1972 | Australia | H04B 1/66 |

OTHER PUBLICATIONS

Taub et al., "Digital Integrated Electronics", McGraw–Hill, Inc., 1977, pp. 538–541.

P. C. Gupta et al., "Transmission of Multiple Audio Channels With TV Using PAM–TOM Scheme", 1979, pages 2.5.1–2.5.5.

The COM System: A new multisound transmission technique G. G. Gassman & E. Eckert, Funkschau 1970, No. 20, pp. 689–692, No. 21, pp. 749–750.

Primary Examiner—John K. Peng
Assistant Examiner—Nathan J. Flynn
Attorney, Agent, or Firm—Woodling, Krost & Rust

[57] ABSTRACT

The apparatus and method is shown for transmitting one or more audio frequency signals on a television video signal including an encoder comprised of a pulse modulator responsive to the audio frequency signals and a combiner to combine modulated pulses from the modulator with the video signal. Also shown is a decoder for use with video signals output from above encoding apparatus and method for decoding the modulated pulses to recover the audio frequency signals.

14 Claims, 6 Drawing Sheets

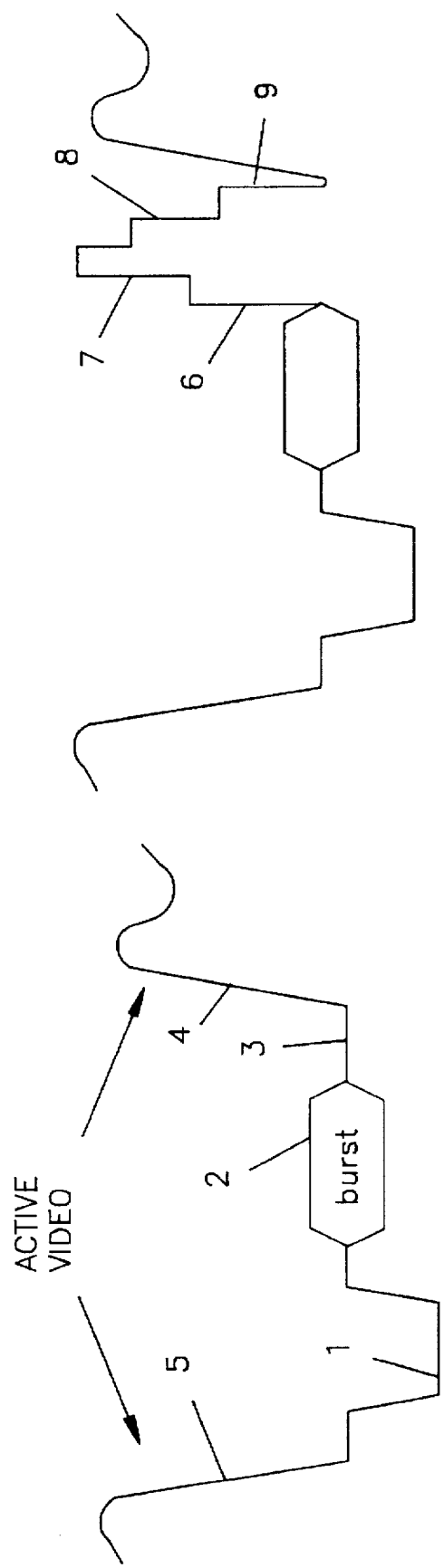

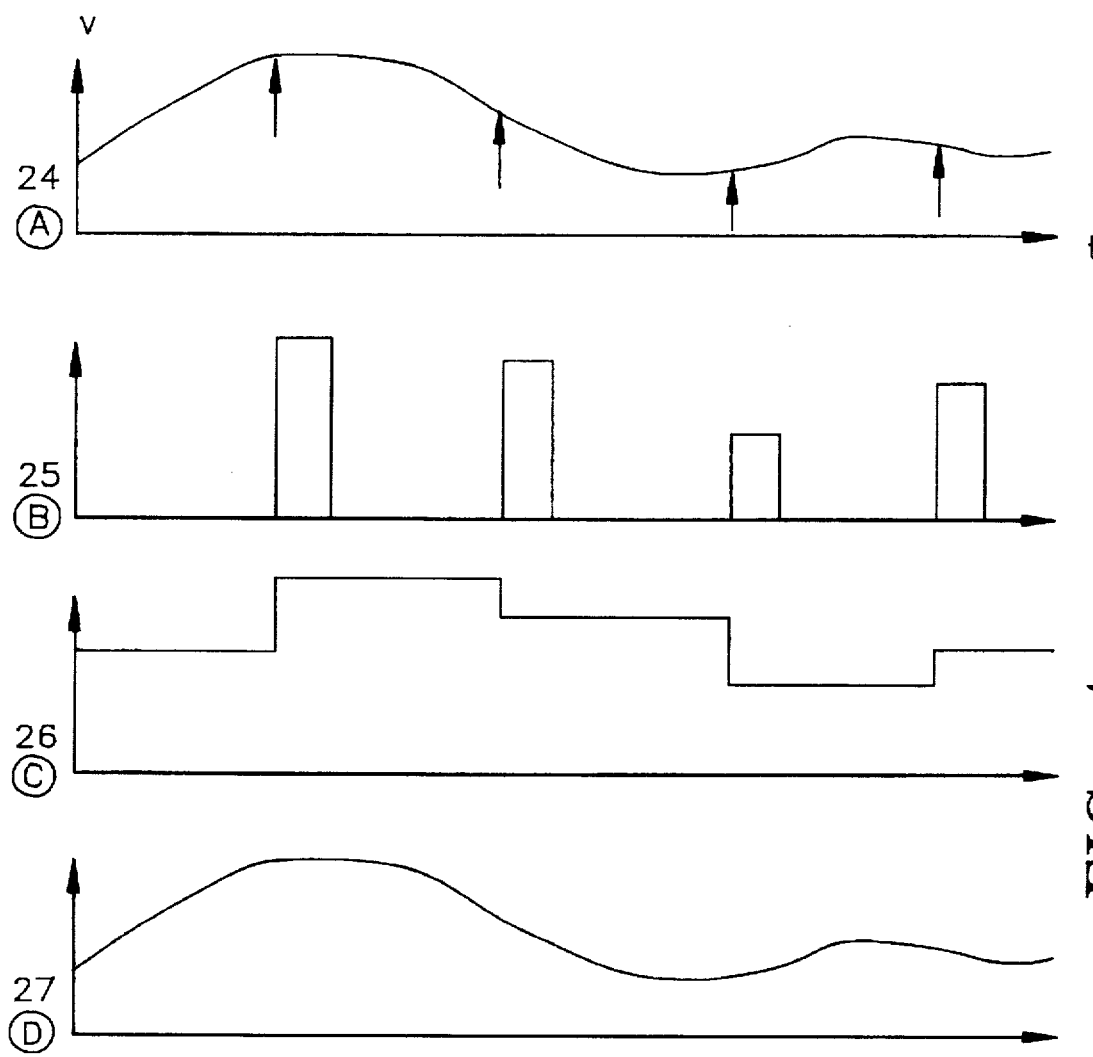
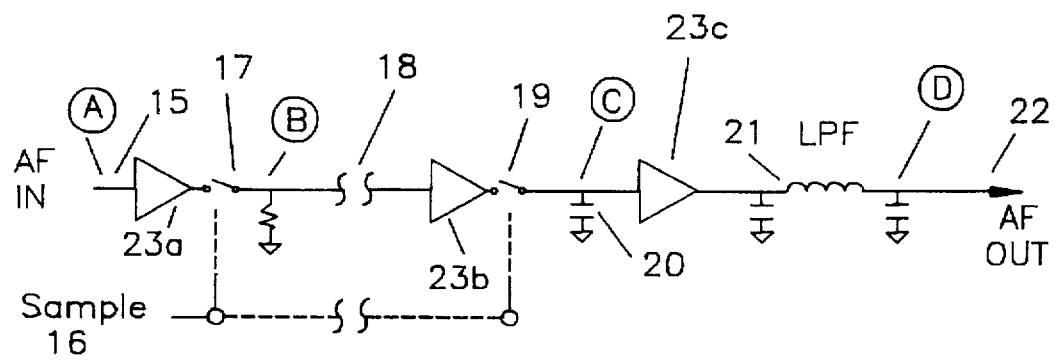
FIG. 4

APPARATUS AND METHOD FOR TRANSMITTING AUDIO SIGNALS AS PART OF A TELEVISION VIDEO SIGNAL

This application is a continuation of application Ser. No. 08/064,736, filed on May 20, 1993 (now abandon), which was a continuation of Ser. No. 07/764,996, filed on Sep. 24, 1991 (now abandon), which was a continuation of application Ser. No. 07/356,670, filed on May 18, 1989 (now abandon), which was continuation of application Ser. No. 06/710,584, filed on Mar. 13, 1985 (now abandon), which was a continuation of application Ser. No. 07/391,707, filed on Jun. 24, 1982 (non abandon).

BACKGROUND OF THE INVENTION

1. Field of the Invention

This invention relates to encoding audio frequency signals on a television video signal while maintaining said video signal in a standard form, thus eliminating audio to video delay problems and providing high quality audio frequency channels.

2. Description of the Prior Art

As television technology develops, several previously unforseen audio related problems are also developing. One of these problems pertains to properly maintaining the timing or synchronization relationship of audio and video signals. This problem was explained in U.S. Pat. No. 4,313,135 which may be referred to for further details. Another problem is that normal broadcast television audio is limited to one channel of 5 KHz bandwidth. With the drastic improvements in television video equipment over the past years, the image quality of television programs now far surpasses the audio quality. There is a great need for a device which can improve the audio quality of a television program, preferably to a stereo high fidelity level, and which can encode this audio in the video signal to prevent audio to video delay problems. Such an encoded audio system will have substantial cost benefits in the transmission of television programs by eliminating the need for a separate audio channel.

Several television systems exist which add digitized audio in one form or another in the blanking interval of the television video signal. This system has been used as a scrambling technique where it is desirable to prevent unauthorized viewing of the television program. Digitized audio requires a great deal of bandwidth, thus causing a substantial portion of the video blanking interval to be filled with digital data seriously affecting sync and burst. Unfortunately, this digital audio in blanking is not directly compatible with existing video systems and the digital audio conversion components, i.e. A-D and D-A, are fairly expensive. The digital audio in blanking does work well as a scrambled system because the digital information requires most sync information to be removed causing television receivers to malfunction.

SUMMARY OF THE INVENTION

The inventive concept herein disclosed provides an apparatus and method for encoding signals having a bandwidth lower than video signals which may or may not be program related, on a television vide signal. Said apparatus and method described herein provides a pulse modulation means responsive to a signal such as a television audio signal to provide an analog modulated signal, a combination circuit to combine said modulated signal with said video signal at predetermined locations in said video signal's waveform while allowing said video signal to remain in a form which can be passed by standard video equipment with little or no modification. Also described are an associated decoder having separation means responsive to aforementioned video signal containing modulated signal to recover said modulated signal from said video signal and filter means to reconstruct the audio frequency signal which was input to the above encoder. The ability of low cost equipment to encode one or more audio frequency signals on a video signal while maintaining said video in a standard form is a very important feature of this invention. If said audio frequency signal is chosen to be program related, such as timecode or program audio, audio to video timing relationships are inherently preserved since both signals are always passed through the same delay after their combination.

BRIEF DESCRIPTION OF THE DRAWINGS

FIG. 1 is a drawing of a typical Horizontal Blanking Waveform of an NTSC or PAL video signal.

FIG. 2 is a drawing of the waveform of FIG. 1 with modulated pulses added after burst.

FIG. 4 is a drawing of a pulse modulation signal system with typical waveforms.

DESCRIPTION OF THE PREFERRED EMBODIMENT

Figure 3:
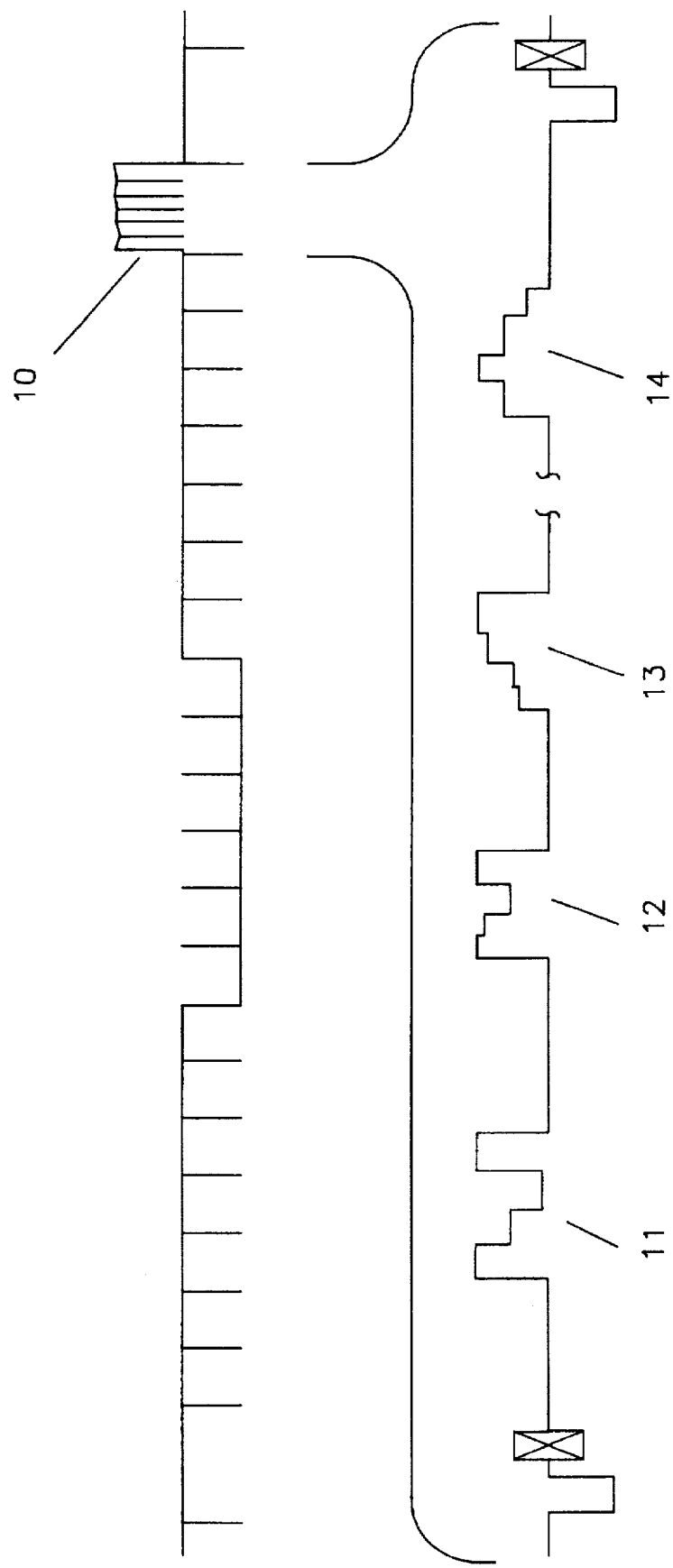
FIG. 3 is a drawing of a typical vertical interval showing audio samples for lines 1–9 combined in line 10.

FIG. 1 is a drawing of a typical video signal horizontal waveform showing sync 1, color burst 2, back porch after burst 3, active video leading edge 4, active video trailing edge 5.

FIG. 2 is a drawing of the same waveform as FIG. 1 with modulated pulses 6, 7, 8 and 9 added in the back porch after burst.

FIG. 3 is a drawing of a typical video signal vertical waveform showing modulated pulses 10 on a video line with expanded drawing showing detail of 10 having pulses 11, 12, 13 and 14.

FIG. 4 is a drawing of a pulse modulation signal system showing signal input 15, sample input 16, switch 17, transmission channel 18, switch 19, hold capacitor 20, low pass filter 21, signal output 22, buffer amplifiers 23a, b and c, input waveform 24 corresponding to 15, sample waveform 25 corresponding to 18, sample and hold waveform 26 corresponding to 20 and output waveform 27 corresponding to 22.

Figure 5:
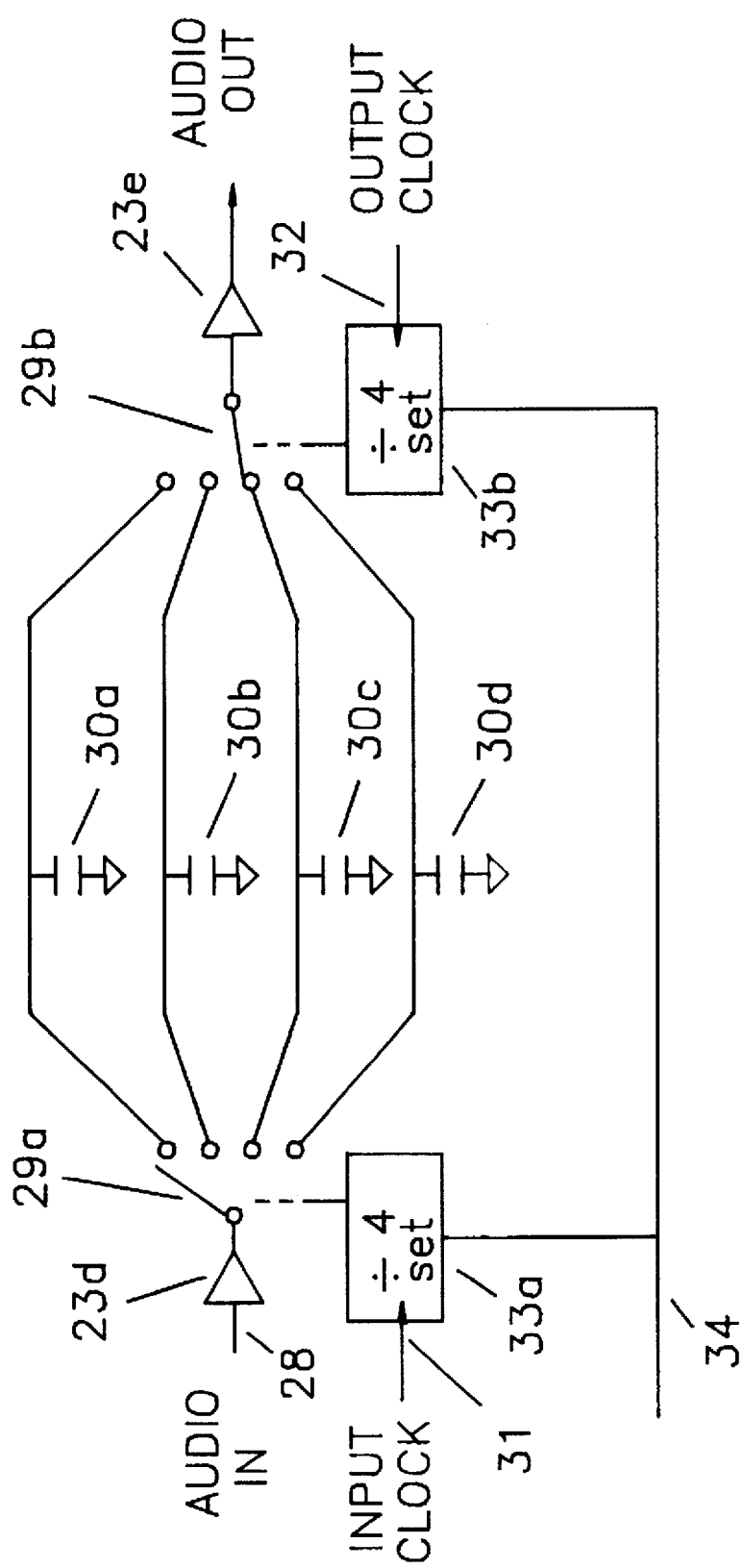
FIG. 5 is a block diagram of a 4 cell FIFO.

FIG. 5 is a drawing of a first in first out memory (FIFO) showing audio input 28, buffer amplifiers 23d and e, analog multiplexers 29a and b hold capacitors 30a–d input clock input 31 output clock input 32 counters 33a and b and set input 34.

Figure 6:
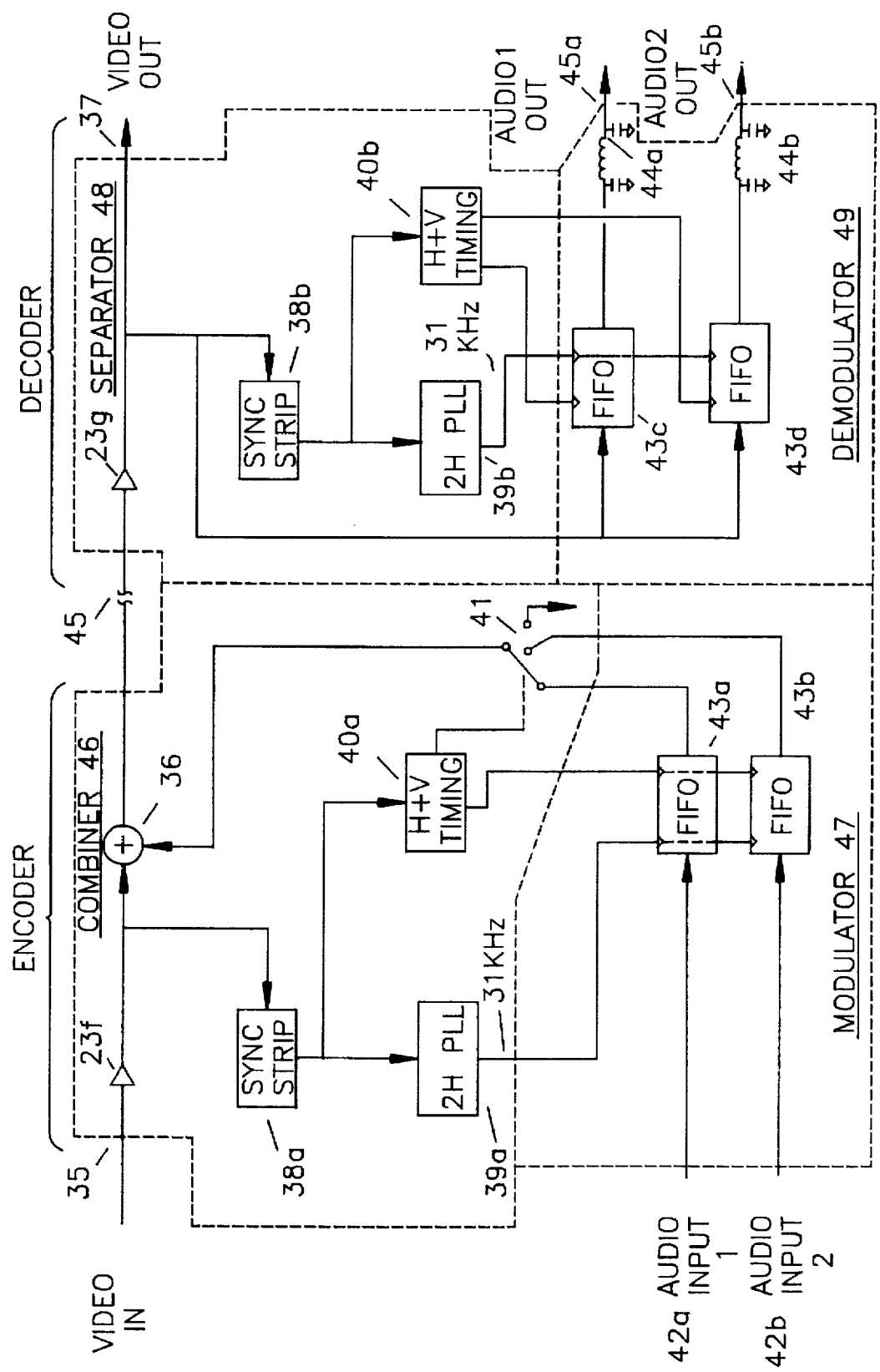
FIG. 6 is a block diagram of an audio in video transmission system showing an encoder and a decoder.

FIG. 6 is a drawing of the preferred embodiment of the invention as used in a system having an encoder made of combiner 46 and modulator 47 and having a decoder made of a separator 48 and demodulator 49. Combiner 46 is composed of buffer 23f having video input 35, adder 36, sync stripper 38a, phase lock loop 39a, timing generator 40a, and switch 41. Modulator 47 is composed of FIFOs 43a and *b* having audio inputs 42*a* and *b* respectively. The decoder is composed of Separator 48 and Demodulator 49. Separator 48 is composed of buffer 23*g* having video output 37, sync stripper 38*b*, phase locked loop 39*b*, and timing generator 40*b*. Demodulator 49 is composed of FIFOs. 43*c* and *d*, low pass filters 44*a* and *b* having outputs 45*a* and *b* respectively. Encoded video and audio from aforementioned encoder pass thru transmission channel 45 to the decoder.

Figure 7:
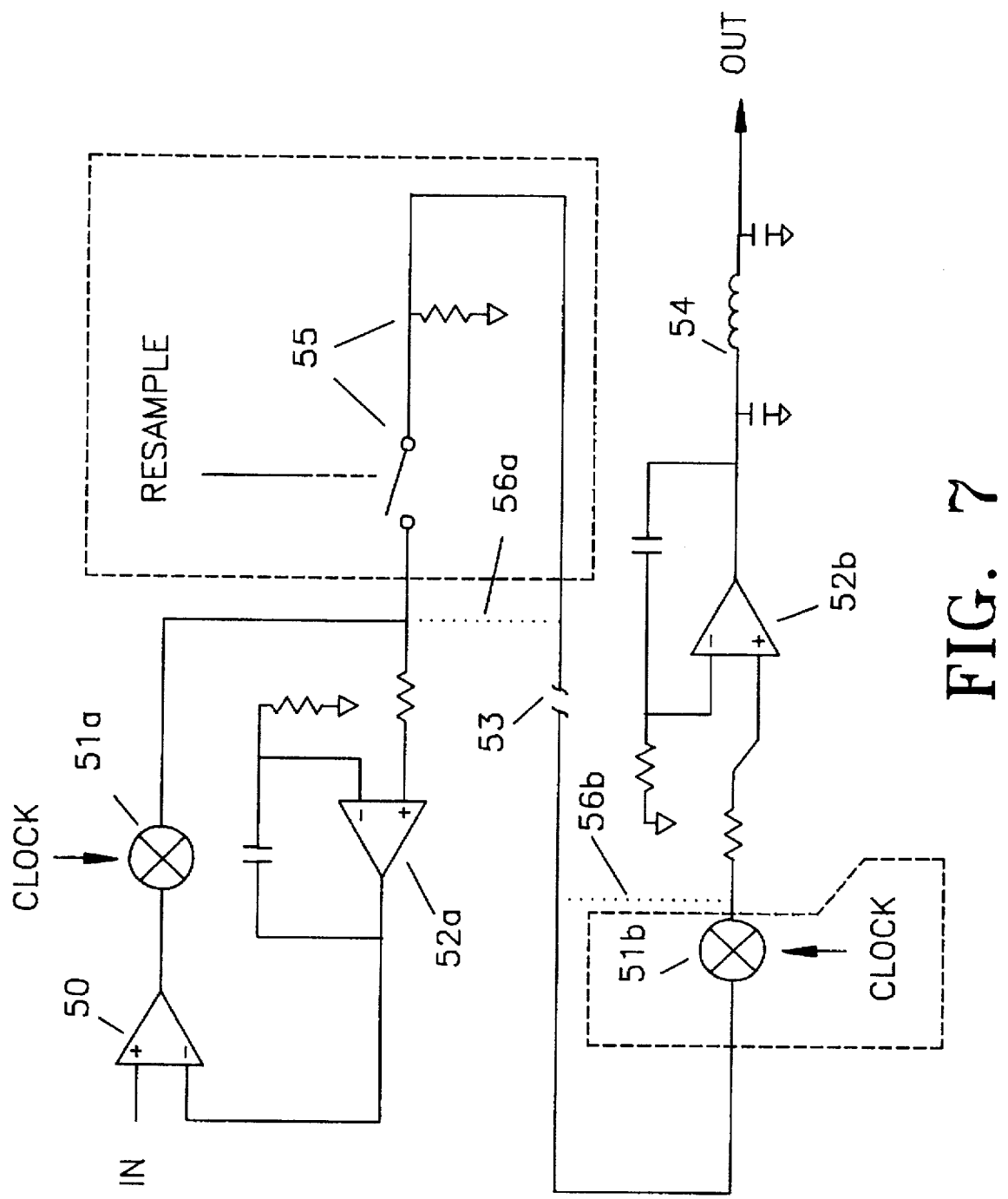
FIG. 7 is a block diagram of a differential analog pulse modulation system.

FIG. 7 is a differential pulse amplitude system having difference amplifier 50, sample and hold circuits 51*a* and *b*, integrators 52*a* and *b*, transmission channel 53, low pass filter 54, resampler 55 and showing optional connections 56*a* and *b* used when 55 and 51*b* are deleted.

In the preferred form of the invention, a relatively low bandwidth signal, which may be a time code signal, control signal, chroma signal, program audio or other low frequency signal, but which signal will be called an audio signal in this description, is sampled periodically as in a pulse amplitude modulation system and the pulses from the sampler are combined with and transmitted as part of the video signal. At the receiving end the pulses are recovered from the video by resampling by a sample and hold which drives a low pass filter to recover the audio signal. An example of such a sampled signal system without the video combination is shown in FIG. 4. Waveform 24 shows the analog signal input at AF input 15 in the block diagram. Waveform 25 shows the output of sample switch 17 which is caused to sample the buffered AF waveform by an external oscillator (not shown) which sampled waveform is transmitted via channel 18 to buffer amplifier 23*b*. The output of buffer amplifier 23*b* is resampled at an appropriate time, related to sample signal 16, by switch 19 which samples are held during open periods of 19 by hold capacitor 20 which waveform is shown by 26. The hold waveform on 20 is buffered by 23*c* and passed through low pass filter 21 to AF output 22 which is shown by 27 which output is essentially the same as the input waveform 24. The above described circuit is a variation of textbook examples of sampled signal systems. Further information of design criteria for these systems relating to signal to noise, bandwidths, spectrum and alias considerations for various pulse modulation techniques which would be suitable for use in this invention may be found in "Reference Data For Radio Engineers", Howard W. Sams & Co., Indianapolis, Ind. 46268; © 1975. Chapter 23 is particularly useful and several further references are given. Such pulse modulation systems include but are not limited to pulse amplitude modulation, pulse position modulation, pulse phase modulation, pulse duration modulation and multilevel pulse amplitude modulation. Also of interest are delta modulation and the family of differential encoding techniques which transmit binary digits in response to the change in an analog signal from one sample time to the next. These systems are not limited in dynamic range as are pulse modulation and binary pulse amplitude modulation systems. Since in high quality audio systems a dynamic range in excess of 80 db is desirable, differential encoding techniques become attractive although they are generally more difficult to implement than analog pulse amplitude modulation systems. Further information on delta modulation and differential encoding may be found in "Principles of Pulse Code Modulation" by K. W. Cattermole, American Elsevier Publishing Co., New York, N.Y. 10017, pages 198–241. In all of the above listed pulse modulation techniques some analog parameter of a pulse such as amplitude, width, phase or position with respect to a reference; are caused to vary in response to a modulating signal. Of particular interest are pulse amplitude modulation such as described with FIG. 4 and multilevel pulse amplitude modulation because of their relative simplicity and low cost. In the former system the pulse amplitude is caused to vary in a linear fashion in response to the amplitude of the input modulating signal. This is the system which is the preferred system for the invention described herein due to its simplicity and low cost. The major disadvantage of this modulation system is that it will have a dynamic range limited by the video channel to around 60 db which is somewhat lower that desirable. If the limited dynamic range becomes a problem in a particular application it can be considerably improved by use of differential pulse modulation such as the differential pulse amplitude system, believed to be previously unknown, such as shown in FIG. 7 which will be discussed later.

The multilevel pulse amplitude system previously mentioned is similar to the pulse amplitude system shown in FIG. 4 in that the pulse amplitude changes in response to the modulating signal however the pulse amplitude is allowed to assume only a limited number of discrete steps. This multilevel system allows a much better signal to noise ratio and dynamic range than the pulse amplitude system at a cost in complexity and bandwidth. For quality audio signals it is required to transmit a number of multilevel pulses for each sample of the modulating signal allowing several hundred possible levels for each sample, which results in poorer utilization of the transmitting channel in order to achieve a better signal to noise ratio. Further discussion of alternate modulation schemes will not be given as this area is well known in the electronics industry and one skilled in the art could use any of several modulation schemes in this invention.

The inventive part of this apparatus and method involves taking the periodically generated pulses output from the sample switch (or modulator) and inserting them in a predetermined position in the video waveform. Since analog pulses or samples are inserted in the video much less space is needed than with digital or multilevel analog systems, thus very little disturbance to the video is generated. FIG. 1 shows a typical television waveform having horizontal sync 1, color burst 2, back porch after burst 3, leading active video 4 and trailing active video 5. FIG. 2 shows the same waveform with four sample pulses 6–9 added in the back porch. This location is the preferred location for adding sample pulses in horizontal blanking since it allows the video signal to be processed by most standard video equipment with little or no modification. Other locations, such as the front porch in the video waveform may be used, however, care must be used so that the pulses do not cause disturbances to the active video, by interfering with synchronization pulses or color burst. It is worthwhile to note here that it is not practical to use only this horizontal back porch area for encoding bits in normal digital audio applications due to the large number of digital bits required. For a typical video signal bandwidth of 5 MHZ it would only be possible to insert around 8 digital bits per horizontal line in the back porch, an insufficient number of bits for most audio signals. Typical state of the art digital audio systems utilize the entire blanking interval for digital bits causing a great deal of interference with, or removal of, sync or burst. Six amplitude modulated pulses per line will however be quite adequate for two high fidelity audio signals and will fit in the 1.4 ms space available on the back porch. Inserting the amplitude modulated pulses into the predetermined location of the video waveform is not a trivial problem. With digitized audio the digital bits are simply stored in a RAM as they are developed and then read out at the appropriate time. There is, however, no analog equivalent of a digital RAM available as a manufactured device, only analog delay lines which could be used but are fairly expensive. The circuit invented to perform the necessary time compression function in a low cost fashion is an analog first in first out memory shown in FIG. 5.

The first in first out analog memory or FIFO of FIG. 5 is constructed of two buffer amplifiers 23d and e, two 4 position analog multiplexers 29a and b which are driven from four bit digital counters 33a and b, and four hold capacitors 30a–d. To understand the operation of the FIFO, assume a short pulse at set input 34, sets counters 33a to count 1 and 33b to count 3. Both counters count 1,2,3,4,1 etc. Audio is input to buffer 23d at 28 and the buffer in turn charges capacitor 30a (because 33a is on count 1) with the audio signal. Next, assume a clock pulse arrives at 31 causing counter 33a to count to 2 allowing buffer 23d to charge capicator 30b. Capacitor 30a will now be holding the charge that was placed on it by the input audio signal at the instant before counter 33a changed count. At each count, the audio signal will charge another capacitor in sequence in effect creating a multiplexed sample and hold. Alternately, for low clock frequencies it may be desired to cause counter circuit 33a to output only a short pulse rather than a count length pulse as described above. This short pulse would effect a more precise sample and hold. The short pulse could be simply effected by differentiating the counter output with an RC Network. Now assume multiplexer 29b is allowing each stored charge in turn to be fed into buffer amplifier 23e in response to output clock input to counter 33b at 32. The output clock does not need to be synchronous with the input clock, only the same frequency. The output to input clock relationship must be such that a new sample is not put on a capacitor until the old has been read out, and a new sample cannot be read out of a capacitor until it has been put on. One skilled in the art will see that by increasing the number of hold sections in this scheme a quite large variation of input clock to output clock phase may be handled providing that the average frequency of the two clocks is exactly the same, i.e., one sample is clocked out for every one clocked in. This will provide for temporary storage of samples, allowing samples to be generated at a steady rate, stored and read out at an intermittant rate. This FIFO memory system is used to generate and store analog samples of an audio input and read out those samples in correct sequence when necessary to insert them in the proper location in the video waveform. This FIFO can be easily built by one skilled in the art using standard integrated circuits. The buffer amplifiers 23d and e could be a National Semiconductor LF347, the counters 33a and b a type 74LS163 the analog multiplexers 29a and b could be a National Semiconductor LF11509. If large enough volume were anticipated it would be possible to build an analog FIFO integrated circuit using MOS charge coupled device technology.

FIG. 6 shows the preferred embodiment of the invention in a system configuration. An encoder made up of a modulator 47 and combiner 46 has as its input two audio channels and an associated video signal. The signals applied at the audio channels need not be program audio but any signal such as those previously described. It should be noted that in this example the audio signals are D.C. offset to an amount corresponding to ½ of the peak positive video voltage to ensure that no negative pulses are added to the video signal. Audio input on 42a and b is applied to FIFOs 43a and b respectively. A clocking signal at exactly twice the video horizontal rate is also input to said FIFO's input clock causing said FIFOs to periodically sample the audio signals, thus effecting pulse amplitude modulation. The clocking signal may be derived from an oscillator utilized in the timing of the input video signal or from a phase locked loop responsive to said input video. At the appropriate time during horizontal blanking, as determined by timing generator 40a, and corresponding to positions 6–9 of FIG. 2, the previously stored samples or modulated pulses are clocked out of said FIFO's 43a and b. Said pulses clocked out are time multiplexed by switch 41 in response to timing generator 40a which time multiplexed pulses are added to aforementioned input video which has been buffered by 23f by adder 36. When pulses are not being inserted switch 41 selects ground, allowing video to pass through adder 36 unchanged. The combination of said multiplexed pulses and buffered video will appear typically as shown in FIG. 2, which combination is output from aforementioned encoder and passed through transmission channel 45 to the decoder. Phase lock loop 39a and timing generator 40a are driven from sync stripper 38a which recovers information from buffered video signal output from 23f. Phase lock loop 39a generates a clocking signal exactly twice the horizontal sync rate of the video signal which provides a precise frequency for the pulse modulation. Alternately a precision oscillator or external reference could be used, and frequencies other than twice horizontal may be used. Timing generator 40a ensures that exactly the same number of pulses are taken out of said FIFOs as are input. This is a relatively simple process during active video lines, however during the vertical sync it is undesirable to insert pulses in vertical sync. The timing generator 40a must therefore not insert pulses during vertical which causes each FIFO 43a and b to store the 18 pulses (2 pulses per H×9 H) generated in each audio channel until after the vertical sync, where all of the stored pulses are then inserted in video as is shown in FIG. 3. It is also possible to store all samples made during the video frame or field and combine those samples with video only in the vertical interval. The need for adding pulses in horizontal blanking is eliminated, thus absolutely no changes are made to the horizontal blanking interval. The main disadvantage to this system is the large FIFO requirement. A CCD analog delay line could replace the FIFOs, however, the CCD devices are expensive and thus somewhat undesirable. All of the parts to build the above described device are standard integrated circuits except the FIFOs which were previously described. Buffer amplifier 23f is a LH0002, Combiner 46 comprises an adder 36, an LH0024, Sync Stripper 38a is a LM741 and TBA950-2, phase lock loop 39a is a LM565 and a EM8530, timing generator 40a is made from 74LS221's and Switch 41 is a LF11509. All part numbers are for National Semiconductor. As previously explained, the FIFOs could be replaced With CCD analog delays such as a Fairchild CCD321 if the higher cost were not a problem. Transmission Channel 45 may be any means capable of passing, recording or storing a video signal. The video signal containing modulated pulses having passed through 45 is input to the decoder at buffer 23g which outputs buffered video at video output 37. Buffered video also drives sync stripper 38b which in turn provides signals for phase lock loop 39b and timing generator 40b. Phase lock loop 39b and timing generator 40b perform essentially the same functions as 39a and 40a respectively, allowing pulses on video to be resampled at the appropriate time by the FIFOs thus recovering the pulses from the video and at the same time performing a sample and hold function. FIFOs 43c and 43d perform a reverse function to that provided by 43a and b where pulses in video are sampled and stored by said first mentioned FIFOs when they are present and clocked out of said FIFOs at a steady rate to drive low pass filters 44a and 44b. Filters 44a and b restore the pulses input to them to audio signals output at 45a and 45b respectively. The above described circuit thus effects demodulation of the modulated pulses. FIFOs 43c and d should be clocked with the short sample and hold clock previously described to prevent video from being clocked into the FIFOs.

The preferred embodiment of the herein described invention utilizes two high performance audio channels to provide stereo audio having a signal bandwidth of 10 KHz. This configuration allows a modulation frequency of exactly 2×Horizontal to be used which greatly simplifies clock recovery for the decoder, a valuable feature of this embodiment of the invention. The input low pass filter normally found in modulators have been omitted since it is assumed the audio equipment which feeds this invention will be properly filtered. The modulation frequency chosen could be lowered if according to Nyquist limitations the input audio bandwidth were further limited. Of particular interest is a case where the modulation frequency is chosen to be 1/10 or less of the video horizontal rate. Modulated pulses can then be generated and immediately added to video directly during horizontal blanking with no FIFO storage required. FIFO clocks may then be chosen so that they straddle the vertical sync area thus further eliminating the need for FIFO storage. In this situation the FIFO function becomes only a sample function. The phase lock loop function becomes a divider reset by vertical and performing a divide by 10, clocked at the horizontal rate. Of course, this system too with a large enough analog memory such as previously described CCD technology all of the audio samples in a field or frame could be stored and then inserted in the active video portion of vertical interval lines.

FIG. 7 shows an analog pulse amplitude modulation system which has been adapted to make a differential system suitable for use with this invention. Audio is input to difference amplifier 50 where it is subtracted from the output of integrator 52a. The output of 50 is periodically sampled by sample and hold amplifier 51a providing samples for integrator 52a. Integrator 52a charges up or down in response to aforementioned samples to provide a signal essentially the same as the input audio signal during the previous clock period thus the difference amplifier 50 outputs the difference or error between the integrator and input signal over one clock cycle.

The signal output from 52a may be said to be responsive to past components of the audio signal input to 50. Assuming resampler 55 and sample and hold 51b are not used and alternate connections 56a and b are made, the samples output from sample and hold 51a are transmitted over Channel 53 to second integrator 52b, identical to 52a. Integrator 52b output is the same as the output from 52a which is essentially the same as the input audio signal, which second integrator output is passed through low pass filter 54 to the modulation system output. Low pass filter 54 removes the clock frequency stepping of the output signal. When utilized in the system of FIG. 6 the output of 51a would be input to FIFO 43a or b represented by 55 (56a and b are removed) and sample and hold 51b would be performed by FIFO 43 c or d respectively. Sample and hold 51b drives integrator 52b which operates the same as previously described since the output of 51b is essentially the same as the output of 51a except delayed slightly. Channel 53 includes the rest of the functions of FIG. 6.

The above described differential pulse amplitude modulation system serves to provide the wide dynamic range of normal delta modulation systems but has a much lower clock rate than the delta system due to the fact that the transmitted sample is analog instead of digital. It does, of course, contain more circuitry than the normal pulse amplitude modulation system shown in FIG. 5 and is therefore not as desirable from a cost standpoint.

As previously mentioned being able to encode one or more high quality audio signals on a video signal without affecting the active portion of said video and preserving the sync and blanking portions of said video so that it may be passed through standard video equipment is a very important feature of this invention. The low cost of this invention, which relates to the absence of A-D and D-A converters and lacking the modulating frequency (FIFO clock) to video horizontal, is another important feature. In addition to the basic function of encoding audio on video it would also be possible to secure the audio signal by scrambling the pulses in response to some scrambling means, such as a pseudo random sequence, before or as they are added to the video. This function could be added to timing generators 40a and 40b of FIG. 6. A scrambling means which could be easily adapted to this function is described in U.S. patent application Ser. No. 6/306,491 now abandoned. The audio scrambler would be especially secure if multilevel pulse amplitude modulation were used and the pulse levels were scrambled. The video signal could, of course, also be scrambled. This would give a completely secured television signal having normal sync and blanking and requiring only a standard video channel for transmission.

Although this invention has been described in its preferred form with a certain degree of particularity, it is understood that the present disclosure of the preferred form has been made only by way of example and that numerous changes in the details of construction and the combination and arrangement of parts may be resorted to as well as the combination of functions within or as part of other devices, without departing from the spirit and the scope of the invention as hereinafter claimed.

What is claimed is:

1. An apparatus for combining a video type signal with samples of a secondary signal, said video signal having a varying horizontal line rate, a secondary signal sampling and modulation circuit, said secondary signal sampling and modulation circuit operating at a first rate, said first rate being dependent on said varying horizontal line rate of said video signal, a timing circuit, a switch circuit, a combining circuit, said switch circuit applying said modulated samples to said combining circuit when appropriate, said timing circuit operating at a second rate, said second rate being dependent on said video signal, said second rate having an average, said average of said second rate equalling said first rate of operation of said secondary signal sampling and modulation circuit said timing circuit, said switch circuit, and said combining circuit encoding samples of said secondary signal with said video signal.

2. The method for combining a secondary signal with a video type signal having a synchronizing portion, said secondary signal having a relatively lower bandwidth, including: sampling said secondary signal, using a difference modulator and providing a modulated signal responsive to the differences of said samples; storing said modulated signal in a memory at a first rate; reading said modulated signal from said memory at a second faster rate; and combining said modulated signals which are read from said memory with said video type signal in a manner which preserves said synchronizing portions thereof.

3. The method for combining a secondary signal which is a digital modulated version of a relatively lower bandwidth signal with a video type signal having a synchronizing portion, including: sampling said relatively lower bandwidth signal in response to said video type signal; providing said secondary signal in response to the differences of said samples obtained in said sampling step; storing said modulated signal in a memory at a first rate; reading said modulated signal from said memory at a second faster rate; and combining said modulated signal which is read from said memory with said video type signal in a manner which preserves said synchronizing portion thereof.

4. An apparatus for encoding a video signal which may have a varying horizontal line rate with samples of a secondary signal, said apparatus having a difference amplifier, a first integrating amplifier, a first clock, said difference amplifier having an output equal to the difference between said secondary signal and a preceding secondary signal generated by said first integrating amplifier, said output of said difference amplifier being periodically sampled by said first clock generating periodic samples, a second clock, said second clock operating at a first rate dependent on said varying horizontal line rate of said video signal, a first modulation circuit sampling said periodic sample of said output of said difference amplifier at said rate of said second clock producing modulated samples, a timing circuit, a switch circuit, a combining circuit, said switch circuit applying said modulated samples to said combining circuit when appropriate, said timing circuit operating at a second rate, said second rate being dependent on said video signal, said second rate having an average, said average of said second rate equalling said first rate, said timing circuit, said switch circuit, and said combining circuit encoding samples of said secondary signal with said video signal.

5. The method of claim 2 wherein said sampling of said secondary signal is performed at a rate responsive to said video signal.

6. The method of claim 2 wherein said sampling of said secondary signal is performed at a rate synchronized to said video signal.

7. The method of claim 2 including an additional step of reading the modulated signal from memory at a rate which is responsive to said video signal.

8. The method of claim 2 including an additional step of reading the modulated signal from memory at a rate which is synchronized to said video signal.

9. An apparatus as claimed in claim 4 wherein a second timing circuit samples said combined audio and video signals extracting therefrom samples of said audio signals, a second modulation circuit stores said samples of said audio signals, a third clock operating at a rate exactly equal to said first rate and being dependent on said horizontal line rate of said video signal, a second integrating amplifier, said third clock outputs samples from said second modulation circuit to said second integrating amplifier, said second integrating amplifier having an output, and, a circuit for filtering said output to produce an audio signal.

10. An apparatus as claimed in claim 1 wherein time compressed audio signal samples are placed between horizontal sync and burst in said video type signal.

11. An apparatus as claimed in claim 1 wherein time compressed audio signal samples are placed in the active video portion of the vertical lines of said video type signal.

12. An apparatus as claimed in claim 1 wherein said secondary signal is sampled in analog form.

13. An apparatus as claimed in claim 1 wherein said samples of said secondary signals are time compressed and are inserted in the vertical lines of the video signal.

14. An apparatus as claimed in claim 1 wherein said samples of said secondary signals are stored before inserting samples in said video type signal.

* * * * *